3,320,033
ABSORBENT, ITS PREPARATION AND USE TO RECOVER METAL VALUES
Mayer B. Goren, Golden, Colo., assignor to Kerr-McGee Oil Industries, Inc., a corporation of Delaware
No Drawing. Filed Mar. 18, 1964, Ser. No. 352,987
29 Claims. (Cl. 23—337)

This invention broadly relates to the recovery of desired dissolved metal values from aqueous media. In some of its more specific aspects, the invention also relates to a novel extractant or absorbent for metal values and a process for preparing the same. The invention further relates to the extraction of desired metal values from aqueous media which contain emulsion forming constituents or other contaminants which normally render liquid-liquid solvent extraction very difficult.

The invention may be illustrated and described hereinafter with specific reference to the extraction of uranium and molybdenum values from an aqueous leach liquor containing solubilized humates and/or solubilized silica. However, it is understood that the invention is useful in the recovery of dissolved metal values from aqueous media in general.

Extensive lignite deposits are found in the Dakotas which contain substantial concentrations of uranium and often significant amounts of molybdenum. The uranium and molybdenum are held in the lignite in a manner somewhat similar to ion exchange attachment to humic acid, as well as in more well defined uranium and molybdenum minerals.

In accordance with prior art practice, it has been found that the lignite may be leached in the raw state with aqueous sulfuric acid in the presence or absence of added oxidizing agents. The uranium and molybdenum values are satisfactorily dissolved from the lignite by the aqueous sulfuric acid solution although the leaching conditions may be somewhat more drastic than those required for leaching other types of uranium ores as apparently the carbon complexes of the uranium are more difficult to solubilize. The big problem heretofore in leaching raw lignite with aqueous sulfuric acid has been liquid-solid separation. During the leaching, substantial quantities of contaminating materials such as organic humates, silica, clay dispersions, etc., are dispersed, peptized or solubilized in the leach solution and interfere markedly with subsequent liquid-solid separations.

The leaching of raw lignite with aqueous sodium carbonate is also very successful in solubilizing the uranium and molybdenum values but liquid-solid separation is impossible on a practical scale. Only small quantities of liquor are obtainable from aqueous carbonate leaches even by exhaustive centrifuging due to the behavior in the aqueous alkaline medium of the suspended clays, solubilized organic humates and peptized organics. Accordingly, aqueous carbonate leaching of raw uranium-containing lignite has been considered to be impractical.

While sulfuric acid leaching of uranium-containing lignite is more satisfactory than sodium carbonate leaching, the processing of uranium and molybdenum containing raw lignite leach liquor from a sulfuric acid leach is extremely difficult in accordance with prior art practice. The sulfuric acid leach liquor cannot be processed by ion exchange to recover the uranium values due to molybdenum poisoning of the ion exchange resin. Also, the prior art solvent extraction processes for recovering the uranium and/or molybdenum values with either amine or phosphate ester extractants is impractical, if not impossible, due to sludge formation and emulsion difficulties.

The lignite leach liquor may be contacted with activated charcoal which removes by adsorption the bulk of the black organic coloring matter which accompanies the uranium and molybdenum into solution. While the charcoal removes most of the interfering humates, it is ineffective in removing the solubilized silica. Processing of charcoal treated lignite leach liquors by solvent extraction with an alkyl or dialkyl phosphate is possible but not practical as the solubilized silica produces an emulsion problem. Also, more important from the economic viewpoint is the fact that the leach liquor contains tremendous quantities of ferric ion which must be reduced before the solvent extraction step.

In view of the foregoing, there has been no entirely satisfactory economic process available heretofore for processing hydrometallurgical leach liquors which contain a high solubilized humate and/or silica content. This is especially true with respect to lignite leach liquors which contain uranium and molybdenum values in addition to solubilized humates and silica as contaminates.

It is an object of the present invention to provide a novel extractant or absorbent for desired metal values in aqueous solution and a process for preparing the same.

It is a further object to provide a novel process for recovering desired metal values from aqueous solution using the extractant or absorbent of the invention.

It is still a further object to provide a novel process for recovering desired metal values from aqueous solution using the novel extractant or absorbent of the invention in the presence of solubilized humates and/or solubilized silica which normally deleteriously affect solvent extraction processes.

It is still a further object to recover uranium and/or molybdenum values from lignite leach liquors without the need for treating the raw liquor to remove solubilized humates and/or silica.

Still other objects and advantages of the invention will be apparent to those skilled in the art upon reference to the following detailed description and the examples.

In accordance with one important variant of the invention, an extractant or absorbent for metal values is provided which comprises a solid substance having an inert hydrophobic surface on which an organic solvent extractant is adsorbed. The resulting extractant or absorbent may be used in recovering desired metal values dissolved in aqueous media without experiencing problems due to emulsion or sludge formation as will be discussed more fully hereinafter.

A wide variety of solid substances having inert naturally hydrophobic surfaces, or surfaces which have been treated to render them inert and/or hydrophobic, may be used as a substrate for adsorbing the organic solvent extractant. Examples of suitable solid substances include elemental sulfur, and especially flowers of sulfur, synthetic organic polymers such as polyacrylonitrile, bentonite or other clays which have been treated with long chain amines to thereby render the surfaces of the clay particles hydrophobic, such as Bentone 35 or 38 produced by National Lead Company, and similar substances.

The solid substances should have an extended surface area so as to provide more surface area per unit volume for adsorbing the organic solvent extractant. The solid substance is preferably particulate in nature and may, for example, have a particle size of about 65 Tyler mesh or smaller, such as −100 to −200 mesh or smaller. Often much larger particles may be used when a high solvent extractant capacity is not necessary, such as particles ¼ to ½ inch in cross section or larger. In many instances, a particle size of about 80 to 100 mesh gives the best overall results for practical commercial operation. The solid substance may be in a form other than particulate, if desired, such as in the form of thin sheets or other configurations designed to assure a high surface area per unit volume.

In instances where a solid substance is satisfactory for use as a substrate except that it is hydrophilic in nature, then the surface may be treated with a substance which will render it hydrophobic prior to adsorbing the organic solvent extractant thereon. Examples of treating agents which are satisfactory for this purpose are the organosilicones, such as the silicone fluids produced by Dow Corning and recommended for use as water repellants. The organosilicones or other known materials for imparting water repellency may be applied to the surface of the solid substance by prior art methods such as by immersing in an organic solvent solution thereof. Exampels of substances which may be treated to provide hydrophobic substrates include carbon black, acitvated carbon or chars, silica gel, pumice and other types or rock or stone. Porous materials such as pumice, carbon black and silica gel may be treated to render the surfaces thereof hydrophobic and overcome the adverse effect of the normally hydrophilic surfaces. For example, porous hydrophilic materials may be treated with an organic solvent solution of dimethyl dichlorosilane, or partially polymerized material of this type, to thereby cause the dimethyl dichlorosilane to be adsorbed in the pores, or porous or nonporous material may be coated with an inert hydrophobic film of organosilanes or silicone like substances.

A wide variety of prior art substantially water insoluble organic solvent extractants are known and may be used in practicing the present invention. Thus, a specific organic solvent extractant may be selected by one skilled in the art in view of the teachings herein and used to prepare an extractant or absorbent of the invention suitable for recovering desired metal values from a given aqueous medium. Some of the preferred organic solvent extractants include organo-phosphorus and organic amine solvent extractants.

For instance, a wide variety of organophosphorus compounds which are known to be satisfactory for extracting values of desired metals such as uranium, vanadium, copper, zinc, etc. from their aqueous solutions may be used in practicing the present invention. Examples of organophosphorus compounds useful as solvent extractants include monoorgano phosphoric acid esters of the general formula

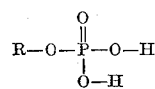

diorgano phosphoric acid esters of the general formula

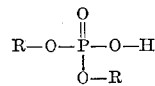

organo pyrophosphates of the general formula

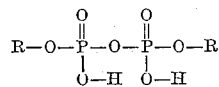

organo phosphonic acids of the general formula

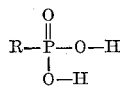

and diorgano phosphinic acids of the general formula

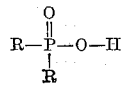

wherein R is a monovalent organic radical selected from the group consisting of alkyl radicals, cycloalkyl radicals, aryl radicals and aralkyl radicals. The organo phosphorus compounds should contain at least 8 carbon atoms and usually for better results 16 to 20 carbon atoms. Preferably, the organic radicals should contain at least 6 carbon atoms and for best results at least 8 carbon atoms, but often up to 12–16 or 20 carbon atoms are satisfactory. In many solvent extraction processes employing organo phosphorus compounds, a dialkyl phosphoric acid ester is preferred such as di-2-ethylhexyl phosphoric acid.

It is also possible to use a wide variety of substantially water insoluble organic amine solvent extractants which are known to be satisfactory for extracting values of desired metals such as uranium, molybdenum, etc. Examples of organic amine solvent extractants include relatively high molecular weight mono-, di- and tri-N-organo substituted amines such as tri-N-alkyl amines where the alkyl groups have at least 6 and preferably about 8–10 to 12–20 carbon atoms per alkyl group, di-N-alkyl amines where the substituent alkyl groups have from about 8–10 to about 20–30 carbon atoms per alkyl group, and mono-N-alkyl amines having at least 14 and preferably about 18–30 carbon atoms in the alkyl substituent. It is also possible in some instances to use quaternary amine solvent extractants having alkyl substituents such as mentioned above and also lower alkyl groups. The alkyl substituents may be normal or extensively branched, the latter usually conferring better organic solvent solubility to the amine. The surface activity of amine solvent extractants may be minimzed to provide very satisfactory levels by "burying" the nitrogen atom in several organo groups and/or by proper branching of alkyl substituents so that the nitrogen atom is largely surrounded by bulky groups. This expedient does not always give preferred results for the primary alkyl amines, and the secondary and tertiary alkyl amines are usually preferred. The foregoing primary, secondary and tertiary amines are commonly referred to as weak base amine solvent extractants, but strong base amine solvent extractants also may be used.

While the above mentioned organophosphorus and organic amine solvent extractants are often preferred when practicing the present invention, it is understood that they are merely exemplary and still other known organic solvent extractants may be employed. It is only necessary to select from the prior art an organic solvent extractant suitable for extracting the desired metal values from a given aqueous solution and then apply the same to the substrate to be discussed more fully hereinafter.

The above mentioned organic solvent extractants may be applied to the substrate in any suitable manner, such as by immersion in or spraying with an organic solvent solution. Preferably, the organic solvent extractant is dissolved in a water soluble or miscible alcohol such as methyl, ethyl, propyl, or isopropyl alcohol, or a water soluble ketone such as acetone, or other suitable water soluble organic solvent, and then the solid material is contacted with the solution. Then, the resultant mixture is flooded with water to thereby cause the organic solvent extractant to be plated or coated uniformly onto the substrate in the form of a thin film. For best results the quantity of organic solvent extractant present in the solution should not be sufficient to form droplets on the substrate as this may result in undue loss of solvent extractant.

The weight percent of organic solvent extractant which may be applied to the substrate surface will depend upon the relative specific gravity of the materials, the particle size of the solid material, and other factors. In many instances, it is preferred to apply 1–15% by weight of solvent extractant to a solid material having a particle size of 80–100 Tyler mesh or smaller. The relative weight percent of organic solvent extractant which it is possible to apply in the form of a thin film does not affect the operativeness of the process as it is only necessary to employ a larger quantity of the resulting absorbent to absorb a given quantity of desired metal values.

After the organic solvent extractant has been adsorbed on the solid material, the resulting absorbent may be contacted with an aqueous medium containing the desired metal values to be recovered to absorb the metal values. For instance, the absorbent may be packed into a column and the aqueous medium percolated through the column, or a bed of the absorbent may be agitated in a vessel while passing the aqueous medium therethrough, or the absorbent may be allowed to fall downward through a vessel containing the aqueous medium. A continuous process also may be used in which a moving stream of absorbent is contacted with a stream of aqueous medium flowing countercurrently thereto. It is understood that for optimum results the amount of aqueous medium contacted with the absorbent contains sufficient metal values to assure that the organic solvent content of the absorbent is loaded to a desired level with the metal values to be recovered.

The aqueous medium may be at the usual pH at which the specific organic solvent extractant adsorbed on the absorbent is normally loaded with desired metal values in accordance with prior art solvent extraction processes. As is well known and understood, this will vary somewhat with the organic solvent extractant employed and the desired metal values to be recovered. However, it is understood that the pH, temperature, contact time, and other variables may be the same as in a prior art liquid-liquid solvent extraction process. For instance, when it is desired to recover dissolved tetravalent vanadium values from an aqueous medium employing di-2-ethylhexyl phosphoric acid as a liquid-liquid solvent extractant, the pH value of leach liquor may be between 1.4 and 3.0 and the temperature may be 90–100° F.; and when it is desired to recover dissolved uranium and/or molybdenum values from an aqueous medium with a tri-n-alkyl amine as the solvent extractant, the pH value of the aqueous medium may be about 0.5–3 and preferably about 1.0–1.5, and ambient temperatures may be used. The above conditions may be employed with the absorbent of the invention when the adsorbed solvent extractant and the metal values are the same.

After the organic solvent extractant which is adsorbed on the solid has been loaded with the desired metal values, then the absorbent and the absorbed metal values are separated from the aqueous medium and stripped with an aqueous stripping agent. The stripping agent may be in accordance with prior art practice, and it may be the same stripping agent that is normally employed in liquid-liquid solvent extraction processes using the adsorbed organic solvent extractant to recover the desired metal values. For instance, when di-2-ethylhexyl phosphoric acid is the solvent extractant adsorbed on the absorbent and quadrivalent vanadium values are loaded thereon, then the stripping agent may be 10–20% aqueous sulfuric acid as used in prior art practice.

The regenerated absorbent from the stripping step may be recycled in the process indefinitely to recover additional metal values. The surprising and unexpectedly high retention of the organic solvent extractant on the substrate is thought to be at least partially due to the tenacity with which a thin film adheres. For instance, when the solvent extractant film is unimolecular or somewhat heavier in thickness, then it adheres so strongly that little, if any, is lost in loading and stripping. On the other hand, if too much of the organic solvent extractant is applied initially, then some of the excess may be removed.

The metal values contained in the stripping solution may be further treated in accordance with prior art practice to produce a commercial product. It is not necessary as a general rule that prior art practice be varied unless desired.

The present invention is especially useful in recovering uranium and/or molybdenum values from a mineral acid lignite leach liquor that contains large amounts of solubilized humates and silica without sludge or emulsion problems. When the invention is employed for this purpose, it is preferred to use a trialkyl amine solvent extractant which is capable of liquid-liquid solvent extracting the uranium and molybdenum simultaneously for deposition on the solid material when preparing the absorbent. After contacting the absorbent with the lignite leach liquor, uranium and molybdenum-containing absorbent may be separated and then stripped with an aqueous carbonate stripping solution containing 5–10%, for example, sodium carbonate to regenerate the absorbent and produce a strip liquor containing uranium and molybdenum values, and all of the organics which were absorbed by the amine. Since it is impossible to completely chemically precipitate the uranium values in the presence of the humates, the most convenient method of recovering uranium and molybdenum products is to evaporate the stripping solution to dryness, and then calcine the residue in an oxidizing atmosphere at a temperature of 400–1000° C., for example. This decomposes the humates and oxidizes them to carbon dioxide. The calcine is leached with water to remove the water soluble constituents and the resulting residue is a substantially pure yellow cake which meets all specifications and no further purification is required. Preferably, a small amount of sodium or potassium hydroxide is present in the water used to leach the calcine. Since the molybdenum content of the calcine is completely soluble in the water, molybdenum values are separated from the uranium values and may be recovered from the leach solution following prior art practices.

The foregoing detailed description and the following specific examples are for purposes of illustration only and are not intended as being limiting to the spirit or scope of the appended claims.

Example I

This example illustrates the adsorption of an amine solvent extractant on activated carbon to produce an activated carbon-amine product useful as an extractant for metal values.

Twenty grams of Alamine 336 (a tri-n-alkyl amine having eight to twelve carbon atoms on the alkyl groups) was dissolved in 500 ml. of isopropyl alcohol and 200 grams of Pittsburgh CAL 12 x 40 mesh activated carbon was added. The mixture was allowed to stand for 22 hours with occasional stirring and the excess liquid was then filtered off. The resulting activated carbon-amine solids were dried over night at 65° C. and showed a weight gain of 24 grams. The unexpectedly high gain in weight was due to incomplete drying.

Example II

This example illustrates the use of the product of Example I in the extraction of uranium and molybdenum values from a lignite leach liquor.

A mined lignite ore containing uranium and molybdenum was percolation leached with aqueous sulfuric acid to produce a raw leach liquor containing 1.24 g./l. of uranium values calculated as $U_3O_8$ and 0.74 g./l. of molybdenum values calculated as Mo. The leach liquor after filtering was black in color and it also contained large amounts of solubilized humates and solubilized silica. It was not possible to recover the uranium and molybdenum values from the filtered raw leach liquor by solvent extraction due to sludge and emulsion formation.

Five hundred milliliters of the above prepared filtered percolation leach liquor having a pH of about 0.9–1.0 was intimately contacted at ambient temperature with 75 g. of the activated carbon-amine product of Example I. The liquor was sampled at five hour and twenty hour intervals and analyzed for $U_3O_8$ and Mo. The following data were obtained:

| | $U_3O_8$, g./l | Mo, g./l |
|---|---|---|
| Head Liquor | 1.24 | 0.74 |
| 5 hours | 0.95 | 0.082 |
| 20 hours | 0.99 | 0.075 |

The leach liquor was almost completely decolorized after the twenty hour contact period and somewhat less so after the five hour contact period. The decrease in uranium absorption after the longer period of time is believed to be due to "elution" of uranium values followed by absorption of additional humates and molybdenum. Further contacting of the leach liquor with fresh activated carbon-amine would have served to absorb the remainder of the uranium values.

The uranium loaded amine-activated carbon was separated from the leach liquor and contacted with two one gram portions of $Na_2CO_3$ in sufficient water to give good wetting. These treatments did not elute uranium or molybdenum values after a six hour contact period. Only when an undiluted 5% by weight solution of soda ash in water was percolated through the loaded amine-activated carbon was colored effluent obtained. While the loaded amine-activated carbon did not elute satisfactorily, other methods could be used to recover the uranium and molybdenum content such as calcining to produce ash from which uranium and molybdenum values may be recovered by prior art practices.

*Example III*

This example illustrates the adsorption of an amine on elemental sulfur to produce an amine-sulfur product useful as an extractant for metal values.

Fifty grams of flowers of sulfur was suspended to 750 ml. of water and wetted by the addition of two drops of a synthetic surfactant. To the stirred suspension was added 5 g. of a long chain trialkyl amine (Alamine 336) dissolved in 5 ml. of isopropyl alcohol. The mixture was stirred mechanically until most of the freed amine was adsorbed by the sulfur, after which the mixture was filtered and the resulting sulfur-amine product was washed with water. The filtrate was opalescent with excess amine.

*Example IV*

In a preliminary test, 500 ml. of percolation lignite leach liquor having a pH of about 0.9–1.0 prepared in accordance with Example II was contacted at ambient temperature with the sulfur-amine product of Example III for 1.5 hours. A small fraction of the sulfur-amine floated while the remainder was wetted and sank in the leach liquor. The mixture was filtered and the resulting uranium and molybdenum loaded sulfur-amine was washed with water. The filtration was very rapid.

Sulfur-amine stripping was examined by contacting the loaded sulfur-amine with aqueous 1 N NaCl/0.05 N HCl, 75 ml. being required to wet the sulfur-amine adequately. The aqueous strip solution was filtered off after a ten minute contact period and the procedure repeated. Next the sulfur-amine was stripped with 2 g. of soda ash and 50 ml. of water. The alkaline strip liquor wetted the sulfur-amine very well and became very dark with desorbed organics. This solution was filtered and the sulfur-amine washed and recontacted with the 500 ml. of "raffinate" from the first loading step, after which the sulfur-amine was again stripped with soda ash. The various liquors were collected and analyzed for $U_3O_8$ and Mo. The following results were obtained:

|  | Volume (ml.) | $U_3O_8$ (g./l.) | Mo (g./l.) |
| --- | --- | --- | --- |
| Head Liquor | 500 | 1.235 | 0.740 |
| 1st raffinate* | 610 | 0.865 | 0.433 |
| 1st NaCl strip | 73 | 0.646 | 0.025 |
| 2nd NaCl strip | 87 | 0.260 |  |
| 1st soda ash strip | 110 | 0.678 | 0.946 |
| 2nd raffinate | 560 | 0.719 | 0.092 |
| 2nd soda ash strip | 165 | 0.986 | 0.940 |

*70 ml. of the 1st raffinate was taken for assay while the remainder was recontacted with the sulfur-amine. This accounts for the smaller volume of liquor in the 2nd raffinate.

From this data it was evident that the capacity of the sulfur-amine is very good, 50 g. of the sulfur-amine having a capacity equivalent to the uranium and molybdenum values in about 150 ml. of the leach liquor. Chloride stripping is not very effective but soda ash stripping gives good desorption.

The preceding table may be summarized as follows:

|  | $U_3O_8$ (g.) | Mo (g.) |
| --- | --- | --- |
| Strip liquor from first cycle | 0.1235 | 0.104 |
| Strip liquor from second cycle | 0.1630 | 0.155 |
| Total for first and second cycle strip liquors | 0.2865 | 0.259 |
| Raffinate from second cycle | 0.396 | 0.052 |
| Feed liquor | 0.667 | 0.370 |

*Example V*

100 ml. of lignite leach liquor having a pH of about 0.9–1.0 prepared in accordance with Example II was contacted at ambient temperature for 1.5 hours with the sulfur-amine prepared in accordance with Example III, the loaded amine stripped with dilute soda ash, and the stripped sulfur-amine recontacted with the first raffinate and again stripped with dilute soda ash. The following results were obtained:

|  | Volume (ml.) | $U_3O_8$ (g./l.) | Mo (g./l.) |
| --- | --- | --- | --- |
| Feed liquors | 100 | 1.30 | 0.694 |
| 1st raffinate | 107 | 0.039 | 0.070 |
| 2nd raffinate | 123 | nil | 0.015 |
| Combined strips | 105 | 1.21 | 0.457 |

Two contacts of the liquor leach with sulfur-amine gave complete uranium extraction and 98% Mo extraction. In the first contact, 96% of the uranium was absorbed and the capacity of the sulfur-amine was about 2.5 grams $U_3O_8$/1000 grams of sulfur-amine. In other experiments with sulfur-amine prepared in a variety of manners, capacity ranged from 3.6 g. $U_3O_8$/1000 g. to 6.6 g. $U_3O_8$/1000 g.

*Example VI*

200 ml. portions of filtered percolation lignite leach liquor having a pH of about 0.9–1.0 prepared in accordance with Example II were given a 10 minute contact at ambient temperature with the 50 g. of sulfur-amine prepared in accordance with Example III, and the loaded amine filtered and washed. The loaded sulfur-amine was stripped with 75 ml. of a solution containing 1.25 g. soda ash and filtered. 25–35 ml. of the strong strip solution filtrate was collected in a separate vessel and the sulfur-amine was then displacement washed with water to dilute the remainder of the strip solution. The diluted strip solution was refortified with 1.25 g. $Na_2CO_3$ and used for the next stripping cycle.

The "raffinate" from the first cycle was recontacted with the stripped sulfur-amine and then sent to a raffinate holding vessel for combining with subsequent raffinates. After each stripping step, a 25–30 ml. portion of the strong stripping solution was taken to a holding vessel. In this manner eight 200-ml. portions of leach liquor were given two sulfur-amine contacts, each one followed by a stripping step. Since a displacement wash followed each loading step, the raffinate volume was greater than 1600 ml. Individual raffinate analyses were made for doubly extracted raffinates and the following results were obtained:

| Raffinate | Volume (ml.) | U₃O₈ (g./l) | Mo (g./l) |
| --- | --- | --- | --- |
| 1 | 253 | 0.134 | 0.091 |
| 2 | 280 | 0.124 | 0.114 |
| 3 | 252 | 0.106 | 0.097 |
| 4 | 240 | 0.099 | 0.112 |
| 5 | 260 | 0.134 | 0.149 |
| 6 | 270 | 0.220 | ¹ 0.186 |
| 7 | 260 | 0.134 | 0.092 |
| 8 | 263 | 0.081 | 0.064 |
| Composite | 1,960 | 0.128 | 0.108 |
| Feed | 1,600 | 1.43 | 0.747 |
| Extraction (percent) | | 89 | 82 |

¹ Short contact time.

Half of the combined raffinate (980 ml.) was given one more contact with the 50 g. of stripped sulfur-amine for 15 minutes and filtered. After soda ash stripping the sulfur-amine was contacted with the remaining portion of combined raffinate. The total combined raffinates now assayed 0.048 g. $U_3O_8$ and 0.049 g. Mo/liter. The total extraction was 96% of the $U_3O_8$ and 92% of the Mo initially present in the liquor.

What is claimed is:

1. An absorbent for recovering dissolved metal values by absorption from aqueous solutions thereof comprising a substantially water insoluble organic solvent extractant for metal values adsorbed on the surface of a water insoluble solid substance, the solid substance having an inert hydrophobic surface of extended surface area and the organic solvent extractant being adsorbed thereon.

2. The absorbent of claim 1 wherein the said substance is nonporous.

3. The absorbent of claim 1 wherein a thin film of the organic solvent extractant is adsorbed on the surface of the solid substance.

4. The absorbent of claim 1 wherein the organic solvent extractant is selected from the group consisting of mono-, di- and trialkyl amine solvent extractants and mono- and dialkyl phosphoric acid ester solvent extractants.

5. An absorbent for recovering dissolved metal values by absorption from aqueous solutions thereof comprising a substantially water insoluble organic solvent extractant for metal values adsorbed on the surface of small particles of water insoluble nonporous solid substance, the particles of solid substance having inert hydrophobic surfaces and a thin film of the organic solvent extractant being adsorbed thereon.

6. The absorbent of claim 5 wherein the organic solvent extraction is selected from the group consisting of mono, di- and trialkyl amine solvent extractants and mono- and dialkyl phosphoric acid ester solvent extractants.

7. The absorbent of claim 5 wherein the solid substance is selected from the group consisting of sulfur and polyacrylonitrile.

8. The absborent of claim 7 wherein the organic solvent extractant is a trialkyl amine solvent extractant for uranium values.

9. The absorbent of claim 7 wherein the organic solvent extractant is di-2-ethylhexyl phosphoric acid.

10. A process for preparing an absorbent for recovering dissolved metal values by absorption from aqueous solutions thereof comprising intimately contacting the surface of a solid water insoluble substance with a solution in an organic solvent of a substantially water insoluble organic solvent extractant for metal values, the solid substance having an inert hydrophobic surface of extended surface area and being intimately contacted with the solution of organic solvent extractant, and removing the organic solvent of the solution whereby the organic solvent extractant is deposited on the hydrophobic surface of the solid substance.

11. The process of claim 10 wherein the solid substance is nonporous.

12. The process of claim 10 wherein a thin film of the organic solvent extractant is deposited on the surface of the solid substance.

13. The process of claim 10 wherein the organic solvent extractant is selected from the group consisting of mono-, di- and trialkyl amine solvent extractants and mono- and dialkyl phosphoric acid ester solvent extractants.

14. A process for preparing an absorbent for recovering dissolved metal values by absorption from aqueous solutions thereof comprising inimately contacting the surfaces of small particles of a solid nonporous water insoluble substance with a solution in a water miscible organic solvent of a substantially water insoluble organic solvent extractant for metal values, the particles of the solid substance having inert hydrophobic surfaces and being intimately contacted with the solution of organic solvent extractant, and then contacting the particles of the solid substance with water whereby the organic solvent extractant is rendered insoluble in the water miscible organic solvent and deposited as a thin film on the hydrophobic surfaces of the particles of the solid substance.

15. The process of claim 14 wherein the organic solvent extractant is selected from the group consisting of mono-, di- and trialkyl amine solvent extractants and mono- and dialkyl phosphoric acid ester solvent extractants.

16. The process of claim 14 wherein the solid substance is selected from the group consisting of sulfur and polyacrylonitrile.

17. The process of claim 16 wherein the organic solvent extractant is a trialkyl amine solvent extractant for uranium values.

18. The process of claim 16 wherein the organic solvent extractant is di-2-ethylhexyl phosphoric acid.

19. In a solvent extraction process wherein an organic solvent extractant for desired metal values is contacted with an aqueous medium containing the metal values dissolved therein and the metal values are absorbed, the organic solvent extractant together with the absorbed metal values is separated from the aqueous medium and the absorbed metal values are recovered therefrom, the improvement comprising contacting the aqueous medium with an absorbent to thereby absorb the metal values, the absorbent comprising a substantially water insoluble organic solvent extractant for the desired metal values adsorbed on the surface of a water insoluble solid substance, the solid substance having an inert hydrophobic surface of extended surface area and the organic solvent extractant being adsorbed thereon, and separating the absorbent together with the absorbed metal values from the aqueous medium.

20. The process of claim 19 wherein the aqueous medium also contains at least one contaminating substance selected from the group consisting of solubilized humates and silica which normally interferes with liquid-liquid solvent extraction.

21. The process of claim 19 wherein the aqueous medium is a lignite leach liquor.

22. In a solvent extraction process wherein an organic solvent extractant for desired metal values is contacted with an aqueous medium containing the metal values dissolved therein and the metal values are absorbed, the organic solvent extractant together with the absorbed metal values is separated from the aqueous medium and the absorbed metal values are recovered therefrom, the improvement comprising contacting the aqueous medium with an absorbent to thereby absorb the metal values, the absorbent comprising a substantially water insoluble organic solvent extractant for the desired metal values adsorbed on the surface of small particles of a nonporous water insoluble solid substance, the particles of the soild substance having inert hydrophobic surfaces and a thin film of the organic solvent extractant being adsorbed thereon, separating the absorbent together with the absorbed metal values from the aqueous medium, contacting the separated absorbent with an aqueous stripping solution for the absorbed metal values to thereby regenerate the absorbent and produce an aqueous stripping solution containing desired metal values, and separating the stripping solution from the regenerated absorbent.

23. The process of claim 22 wherein the aqueous medium also contains at least one contaminating substance selected from the group consisting of solubilized humates and silica which normally interferes with liquid-liquid solvent extraction.

24. The process of claim 22 wherein the aqueous medium is a lignite leach liquor.

25. In a solvent extraction process wherein an organic solvent extractant for desired metal values is contacted with an aqueous medium containing the metal values dissolved therein and the metal values are absorbed, the organic solvent extractant together with the absorbed metal values is separated from the aqueous medium and the absorbed metal values are recovered therefrom, the improvement comprising contacting the aqueous medium with an absorbent to thereby absorb the metal values, the absorbent comprising a substantially water insoluble organic solvent extractant for the desired metal values absorbed on the surface of a water insoluble solid substance, the organic solvent extractant being selected from the group consisting of mono-, di- and trialkyl amine solvent extractants and mono- and dialkyl phosphoric acid ester solvent extractants, the solid substance having an inert hydrophobic surface of extended surface area and the organic solvent extractant being absorbed thereon, and separating the absorbent together with the absorbed metal values from the aqueous medium.

26. In a solvent extraction process wherein an organic solvent extractant for desired metal values is contacted with an aqueous medium containing the metal values dissolved therein and the metal values are absorbed, the organic solvent extractant together with the absorbed metal values is separated from the aqueous medium and the absorbed metal values are recovered therefrom, the improvement comprising contacting the aqueous medium with an absorbent to thereby absorb the metal values, the absorbent comprising a substantially water insoluble organic solvent extractant for the desired metal values adsorbed on the surface of small particles of a nonporous water insoluble solid substance, the organic solvent extractant being selected from the group consisting of mono-, di- and trialkyl amine solvent extractants and mono- and dialkyl phosphoric acid ester solvent extractants, the particles of the solid substance having inert hydrophobic surfaces and a thin film of the organic solvent extractant being adsorbed thereon, separating the absorbent together with the absorbed metal values from the aqueous medium, contacting the separated absorbent with an aqueous stripping solution for the absorbed metal values to thereby regenerate the absorbent and produce an aqueous stripping solution containing desired metal values, and separating the stripping solution from the regenerated absorbent.

27. The process of claim 26 wherein the organic solvent extractant is a trialkyl amine solvent extractant for uranium values.

28. The process of claim 26 wherein the organic solvent extractant is di-2-ethylhexyl phosphoric acid.

29. In a solvent extraction process wherein an organic solvent extractant for desired metal values is contacted with an aqueous medium containing the metal values dissolved therein and the metal values are absorbed, the organic solvent extractant together with the absorbed metal values is separated from the aqueous medium and the absorbed metal values are recovered therefrom, the improvement comprising contacting the aqueous medium with an absorbent to thereby absorb the metal values, the absorbent comprising a substantially water insoluble organic solvent extractant for the desired metal values adsorbed on the surface of small particles of a nonporous water insoluble solid substance, the solid substance being selected from the group consisting of sulfur and polyacrylonitrile, the particles of the solid substance having inert hydrophobic surfaces and a thin film of the organic solvent extractant being adsorbed thereon, separating the absorbent together with the absorbed metal values from the aqueous medium, contacting the separated absorbent with an aqueous stripping solution for the absorbed metal values to thereby regenerate the absorbent and produce an aqueous stripping solution containing desired metal values, and separating the stripping solution from the regenerated absorbent.

References Cited by the Examiner

UNITED STATES PATENTS 2,578,665 12/1951 Bjorksten _____ 260—17
2,728,633 12/1955 Arden et al.
3,183,059 5/1965 Reisenauer.

CARL D. QUARFORTH, *Primary Examiner.*

BENJAMIN R. PADGETT, L. DEWAYNE RUTLEDGE, *Examiners.*

S. TRAUB, *Assistant Examiner.*